US011399692B2

(12) United States Patent
Dries

(10) Patent No.: US 11,399,692 B2
(45) Date of Patent: Aug. 2, 2022

(54) DISHWASHING APPLIANCE HAVING A WIRELESSLY POWERED SPRAY ASSEMBLY

(71) Applicant: Haier US Appliance Solutions, Inc., Wilmington, DE (US)

(72) Inventor: John Edward Dries, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 43 days.

(21) Appl. No.: 17/093,498

(22) Filed: Nov. 9, 2020

(65) Prior Publication Data

US 2022/0142448 A1    May 12, 2022

(51) Int. Cl.
| | |
|---|---|
| *A47L 15/22* | (2006.01) |
| *A47L 15/00* | (2006.01) |
| *A47L 15/50* | (2006.01) |
| *H02J 50/05* | (2016.01) |
| *H02J 50/12* | (2016.01) |
| *A47L 15/42* | (2006.01) |

(52) U.S. Cl.
CPC ............ *A47L 15/22* (2013.01); *A47L 15/006* (2013.01); *A47L 15/4225* (2013.01); *A47L 15/50* (2013.01); *H02J 50/05* (2016.02); *H02J 50/12* (2016.02)

(58) Field of Classification Search
CPC .... A47L 15/22; A47L 15/006; A47L 15/4225; A47L 15/50; H02J 50/05; H02J 50/12
See application file for complete search history.

(56) References Cited

U.S. PATENT DOCUMENTS

| | | | |
|---|---|---|---|
| 1,119,732 A | 12/1914 | Tesla | |
| 5,579,789 A * | 12/1996 | Spiegel | ............. A47L 15/23 241/73 |
| 8,466,583 B2 | 6/2013 | Karalis et al. | |
| 8,552,592 B2 * | 10/2013 | Schatz | .............. H01Q 7/00 307/104 |
| 9,307,888 B2 | 4/2016 | Baldwin et al. | |
| 2006/0281435 A1 * | 12/2006 | Shearer | .............. H02J 50/20 455/343.1 |

(Continued)

FOREIGN PATENT DOCUMENTS

| | | |
|---|---|---|
| CN | 209220186 U | 8/2019 |
| EP | 0678275 A1 | 10/1995 |

*Primary Examiner* — Benjamin L Osterhout
(74) *Attorney, Agent, or Firm* — Dority & Manning, P.A.

(57) ABSTRACT

A dishwashing appliance may include a cabinet, a tub, a spray arm, a fluid pump, an electric motor, a wireless power receiver, and a wireless power transmitter. The tub may define a wash chamber within the cabinet. The spray arm may be movably disposed within the wash chamber. The spray arm may define one or more orifices to direct wash fluid to the wash chamber. The fluid pump may be in fluid communication with the spray arm to motivate wash fluid thereto. The electric motor may be mounted apart from the fluid pump in mechanical communication with the spray arm to direct a spray position thereof. The wireless power receiver may be in electrical communication with the electric motor. The wireless power transmitter may be spaced apart from the fluid pump in operable communication with the wireless power receiver to transmit an electromagnetic field thereto.

19 Claims, 2 Drawing Sheets

(56) References Cited

U.S. PATENT DOCUMENTS

| | | | | |
|---|---|---|---|---|
| 2008/0054745 | A1* | 3/2008 | Sentmanat | H02K 21/14 |
| | | | | 310/156.01 |
| 2009/0178698 | A1* | 7/2009 | Delgado | A47L 15/22 |
| | | | | 134/172 |
| 2009/0251113 | A1* | 10/2009 | Raghuprasad | A47J 43/085 |
| | | | | 322/39 |
| 2010/0192995 | A1* | 8/2010 | Bertsch | A47L 15/22 |
| | | | | 134/56 D |
| 2011/0226292 | A1* | 9/2011 | Ulger | A47L 15/0015 |
| | | | | 134/198 |
| 2017/0138109 | A1* | 5/2017 | Weißenburger | A47L 15/4257 |
| 2018/0020875 | A1* | 1/2018 | Kolar | A47J 43/0777 |
| | | | | 366/279 |
| 2018/0168425 | A1* | 6/2018 | Wilson | A47L 15/22 |
| 2018/0325348 | A1* | 11/2018 | Dries | A47L 15/42 |

* cited by examiner

DISHWASHING APPLIANCE HAVING A WIRELESSLY POWERED SPRAY ASSEMBLY

FIELD OF THE INVENTION

The present subject matter relates generally to dishwashing appliances, and more particularly to spray assemblies for dishwashing appliances.

BACKGROUND OF THE INVENTION

Dishwashing appliances generally include a tub defining a wash chamber or compartment wherein one or more rack assemblies, into which various articles may be loaded for cleaning, are positioned. Each rack may include features such as, for example, tines that hold and orient the articles to receive sprays of wash and rinse fluids during the cleaning process. The articles to be cleaned may include a variety of dishes, cooking utensils, silverware, and other items.

A dishwashing appliance is also typically provided with one or more spray assemblies that can apply or direct wash fluid towards articles disposed within the rack assemblies in order to clean such articles. The spray assemblies can include a lower spray assembly mounted to the tub at a bottom of the wash compartment, a mid-level spray arm assembly mounted to an upper rack assembly, and a top spray assembly mounted to the tub at a top of the wash compartment.

Conventionally, such spray assemblies rotate relative to the wash chamber. More specifically, the spray assemblies typically include a one or more orifices or nozzles through which a fluid flows under pressure to provide a spray onto the articles during a wash or rinse cycle. The orientation of the nozzles combined with the action and reaction forces of the exiting fluid causes the spray arms of the spray assembly to rotate 360 degrees relative to the wash chamber so long as a sufficient amount of fluid under pressure is supplied to the spray arms.

Since the movement of conventional spray assemblies is controlled by fluid pressure, it is difficult—if not impossible—to alter the path or speed of a spray assembly's movement without impacting the force of fluid directed from the spray assembly. This can present issues with obtaining sufficient coverage of the spray assembly. Moreover, since friction needs to be minimized to permit movement controlled by fluid pressure, it can be easy for the spray assembly to become inadvertently blocked such that movement is prevented. This is especially true for spray assemblies that are mounted above one or more racks.

As a result, it would be useful to provide an appliance or spray assembly for enhancing control of coverage or movement. In particular, it would be advantageous if such an appliance or assembly could be provided without introducing additional potential leak points such that might be created from additional mechanical connections through the tub.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a tub, a spray arm, a fluid pump, an electric motor, a wireless power receiver, and a wireless power transmitter. The tub may define a wash chamber within the cabinet. The spray arm may be movably disposed within the wash chamber. The spray arm may define one or more orifices to direct wash fluid to the wash chamber. The fluid pump may be in fluid communication with the spray arm to motivate wash fluid thereto. The electric motor may be mounted apart from the fluid pump in mechanical communication with the spray arm to direct a spray position thereof. The wireless power receiver may be in electrical communication with the electric motor. The wireless power transmitter may be spaced apart from the fluid pump in operable communication with the wireless power receiver to transmit an electromagnetic field thereto.

In another exemplary aspect of the present disclosure, a dishwashing appliance is provided. The dishwashing appliance may include a cabinet, a tub, a spray arm, a fluid pump, an electric motor, a wireless power receiver, and a wireless power transmitter. The tub may define a wash chamber within the cabinet. The spray arm may be movably disposed within the wash chamber. The spray arm may define one or more orifices to direct wash fluid to the wash chamber. The fluid pump may be in fluid communication with the spray arm to motivate wash fluid thereto. The electric motor may be mounted within the wash chamber in mechanical communication with the spray arm to direct a spray position thereof. The wireless power receiver may be in electrical communication with the electric motor. The wireless power transmitter mounted to the cabinet outside of the tub in operable communication with the wireless power receiver to transmit an electromagnetic field thereto.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
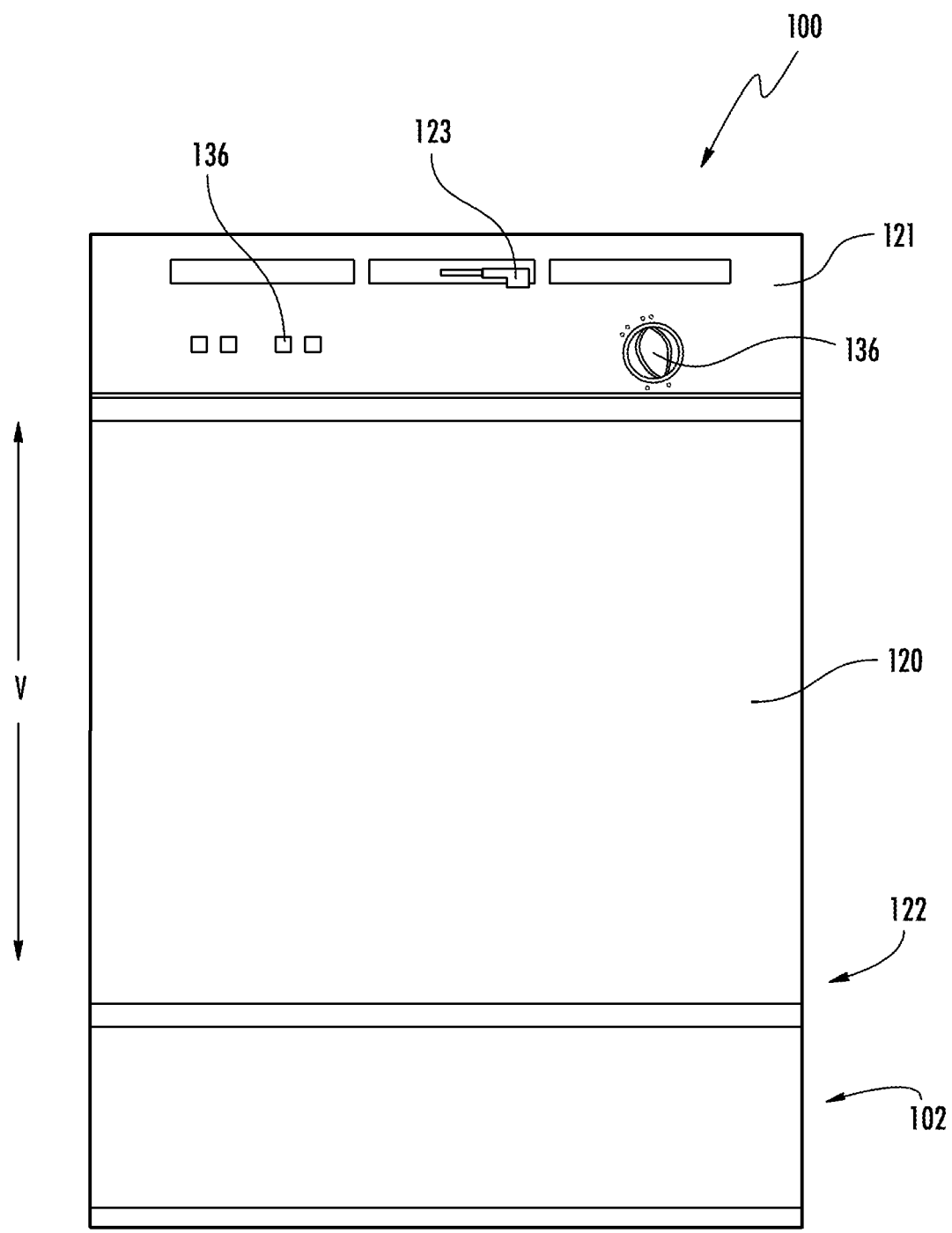
FIG. 1 provides a front elevation view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
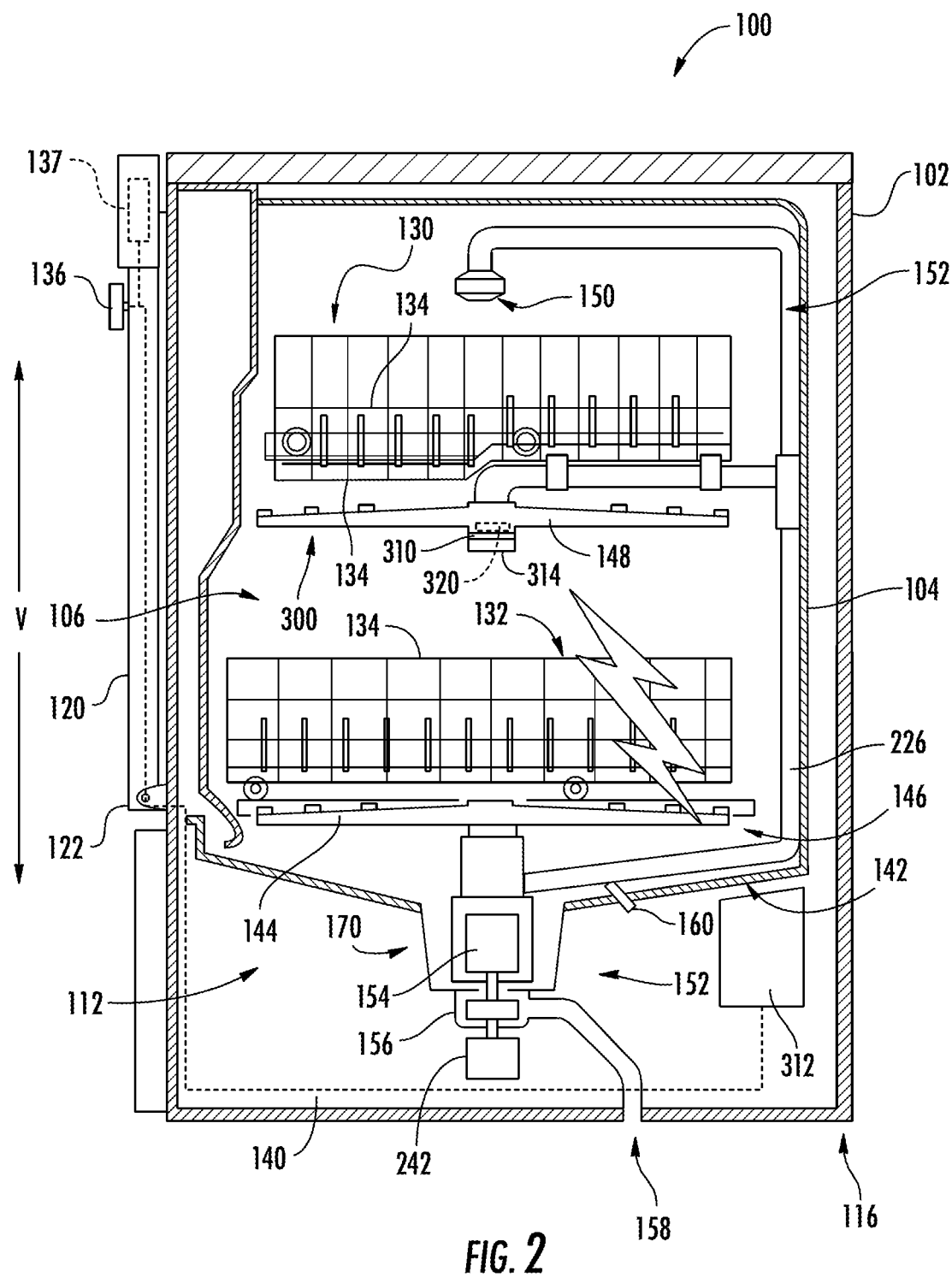
FIG. 2 provides a side, cross-sectional view of the exemplary dishwashing appliance of FIG. 1.

FIGS. 1 and 2 depict a dishwashing appliance 100 according to an exemplary embodiment of the present disclosure. As shown in FIG. 1, dishwashing appliance 100 includes a cabinet 102. Cabinet 102 has a tub 104 therein that defines a wash compartment 106. The tub 104 also defines a front opening (not shown). Dishwashing appliance 100 includes a door 120 hinged at a bottom 122 of door 120 for movement between a normally closed, vertical position (shown in FIGS. 1 and 2), wherein wash compartment 106 is sealed shut for washing operation, and a horizontal, open position for loading and unloading of articles from dishwashing appliance 100. In some embodiments, a latch 123 is used to lock and unlock door 120 for access to wash compartment 106. Tub 104 also includes a sump 170 positioned adjacent a bottom portion 112 of tub 104 and configured for receipt of a liquid wash fluid (e.g., water, detergent, wash fluid, or any other suitable fluid) during operation of dishwashing appliance 100.

In certain embodiments, a spout 160 is positioned adjacent sump 170 of dishwashing appliance 100. Spout 160 is configured for directing liquid into sump 170. Spout 160 may receive liquid from, for example, a water supply (not shown) or any other suitable source. In alternative embodiments, spout 160 may be positioned at any suitable location within dishwashing appliance 100 (e.g., such that spout 160 directs liquid into tub 104). Spout 160 may include a valve (not shown) such that liquid may be selectively directed into tub 104. Thus, for example, during the cycles described below, spout 160 may selectively direct water or wash fluid into sump 170 as required by the current cycle of dishwashing appliance 100.

Rack assemblies 130 and 132 may be slidably mounted within wash compartment 106. In some embodiments, each of the rack assemblies 130 and 132 is fabricated into lattice structures including a plurality of elongated members 134. Each rack of the rack assemblies 130 and 132 is generally adapted for movement between an extended loading position (not shown) in which the rack is substantially positioned outside the wash compartment 106, and a retracted position (shown in FIGS. 1 and 2) in which the rack is located inside the wash compartment 106. A silverware basket (not shown) may be removably attached to rack assembly 132 for placement of silverware, utensils, and the like, that are otherwise too small to be accommodated by the racks 130 and 132.

It should be appreciated that the subject matter disclosed herein is not limited to any particular style, model or configuration of dishwashing appliance, and that the embodiment depicted in the figures is for illustrative purposes only. For example, instead of the racks 130 and 132 depicted in FIG. 1, dishwashing appliance 100 may be of a known configuration that utilizes drawers that pull out from the cabinet and are accessible from the top for loading and unloading of articles.

In certain embodiments, dishwashing appliance 100 includes a lower spray assembly 144 that is rotatably mounted within a lower region 146 of the wash compartment 106 and above sump 170 so as to rotate in relatively close proximity to rack assembly 132. Additionally or alternatively, a mid-level spray assembly 148 may be located in an upper region of the wash compartment 106 and may be located in close proximity to upper rack 130. Further additionally or alternatively, an upper spray assembly 150 may be located above the upper rack 130.

In exemplary embodiments, lower and mid-level spray assemblies 144 and 148 and the upper spray assembly 150 are fed by a fluid circulation assembly 152 for circulating water and dishwasher fluid in the tub 104. Fluid circulation assembly 152 includes one or more fluid pumps (e.g., a circulation pump 154 or a cross-flow/drain pump 156 driven by an electric pump motor 242). Some embodiments include circulation pump 154 positioned at least partially within sump 170 and drain pump 156 positioned below circulation pump 154 in fluid communication with sump 170. Additionally, drain pump 156 may be configured for urging the flow of wash fluid from sump 170 to a drain 158 when activated. By contrast, circulation pump 154 may be configured for supplying a flow of wash fluid from sump 170 to spray assemblies 144, 148 and 150 by way of one or more circulation conduits 226 when activated. Moreover, a filter assembly may be also positioned at least partially in sump 170 for filtering food particles or other debris, referred to herein generally as soils, from wash fluid prior to such wash fluid flowing to circulation pump 154.

Spray assemblies 144, 148, and 150 include an arrangement of discharge nozzles or orifices for directing wash fluid onto dishes or other articles located in rack assemblies 130 and 132. As will be described in greater detail below, one or more of the spray assemblies of appliance 100 (e.g., spray assembly 144, 148, or 150) may be provided as a powered spray arm 300 with an electric motor 310 and wireless power receiver 314 in electrical communication (e.g., wired communication to exchange a current or voltage) with the electric motor 310.

Generally, the electric motor 310 is in mechanical communication with a spray arm 300 to move (e.g., rotate, translate, etc.) the spray arm 300—or otherwise direct a spray position of the spray arm 300 (e.g., during a wash or rinse cycle). To this end, electric motor 310 is provided as any suitable motor. Optionally, electric motor 310 is a direct current (DC) motor configured to receive a DC voltage. It is notable that in some such embodiments, electric motor is a relatively low power motor, such as one having a power rating less than or equal to 50 watts (e.g., 40 watts). Thus, the efficiency of power transmission to the motor 310 may be less relevant for the purposes of meeting various governmental efficiency or power consumption requirements.

During use, the electric motor 310 may control where the corresponding spray arm 310 directs or sprays wash fluid within the wash chamber 106. In other words, the electric motor 310 may control movement of the corresponding spray arm 300 to provide coverage of articles within an adjacent rack (e.g., rack 130). The movement of powered spray arm 300 may be distinct from what is typically possible (e.g., with conventional spray arms). For instance, powered spray 300 arm may be moved by electric motor 310 in a path that is variable, wash zone contingent, or slower than would be possible with typical fluid-pressure-contingent assemblies. Advantageously, electric motor 310 may control the position of the powered spray arm 300 without requiring a mechanical linkage or drive train that extends through the inner wall of tub 104, which might otherwise create a potential failure or leak point.

Optionally, one or more other spray assemblies (i.e., other than powered spray arm 300) may include an arrangement of discharge nozzles that provide a rotational force by virtue of wash fluid flowing through the discharge ports. The resultant rotation of the such spray assemblies provides coverage of dishes and other dishwasher contents with a spray of wash fluid.

Dishwashing appliance 100 is further equipped with a controller 137 to regulate operation of the dishwashing appliance 100. Controller 137 may include a memory (e.g., non-transitive media) and microprocessor, such as a general or special purpose microprocessor operable to execute programming instructions or micro-control code associated with a washing operation. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

Controller 137 may be positioned in a variety of locations throughout dishwashing appliance 100. Specifically, controller 137 may be spaced apart from or otherwise outside of wash chamber 106. In the illustrated embodiment, controller 137 may be located within a control panel area 121 of door 120 as shown. In such an embodiment, input/output ("I/O") signals may be routed between controller 137 and various operational components of dishwashing appliance 100 along wiring harnesses that may be routed through the bottom 122 of door 120. Typically, controller 137 includes a user interface panel 136 through which a user may select various operational features and modes and monitor progress of the dishwashing appliance 100. In one embodiment, user interface 136 may represent a general purpose I/O ("GPIO") device or functional block. In one embodiment, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication (e.g., electrical communication) with controller 137 via one or more signal lines or shared communication busses.

In some embodiments, a wireless power transmitter 312 is provided to supply power to one or more electric devices within dishwashing appliance 100. In particular, wireless power transmitter 312 may be mounted on or within cabinet 102. Moreover, wireless power transmitter 312 may be in operable communication (e.g., wireless or contact-free communication) with the wireless power receiver 314 to transmit an electromagnetic field thereto, which may then power electric motor 310 at the corresponding powered spray arm 300 (e.g., spray arm 148).

As shown, wireless power transmitter 312 and wireless power receiver 314 may be physically spaced apart at discrete portions of dishwashing appliance 100. When assembled, wireless power transmitter 312 and wireless power receiver 314 may thus be wirelessly coupled without ever coming into direct or electrical contact. In turn, an air gap may be maintained between the two. In some embodiments, wireless power receiver 314 may be mounted or disposed within the wash chamber 106 while wireless power transmitter 312 is mounted or disposed outside of wash chamber 106. For instance, the inner liner of tub 104 may be electrically sealed such that no electrical wires or busses pass through tub 104. Advantageously, a potential failure or leak point may be avoided while still permitting power to be supplied to an electrical component connected to wireless power receiver 314.

When assembled, electric motor 310 may be disposed within wash chamber 106. In some such embodiments, electric motor 310 may be mounted on, or fixed relative to, powered spray arm 300. For instance, as illustrated, powered spray arm 300 may be provided at or as spray arm 148. When assembled, powered spray arm 300 may be disposed above the lower rack 132 along the vertical direction V (e.g., to provide a spray to upper rack 130 or lower rack 132). Notably, powered spray arm 300 may avoid a complex mechanical linkage or drive train that might otherwise risk damage from articles within upper rack 130.

Additionally or alternatively, powered spray arm 300 may be mounted on a movable rack, such as upper rack 130. For instance, powered spray arm 300 may be fixed relative to the upper rack 130 to slide therewith. Electric motor 310 may also be supported on, or fixed relative to, the same (e.g., upper rack 130). Optionally, wireless power receiver 314 may be supported on or fixed relative to electric motor 310. Advantageously, the electric motor 310 and wireless power receiver 314 may be moved with or on upper rack 130 without affecting or interfering with any electrical connection.

Generally, wireless power transmitter 312 and wireless power receiver 314 may be configured to exchange an electromagnetic field that generates an electrical current. For instance, wireless power transmitter 312 may transmit an electromagnetic field (e.g., as initiated by controller 137) that is received at wireless power receiver 314. At wireless power receiver 314, an electrical current or voltage may be generated and, subsequently, transmitted to electric motor 310 (e.g., through an on-board rectifying circuit or activation circuit). For instance, the electromagnetic field may induce an electrical current at wireless power receiver 314. Thus, the wireless power transmitter 312 and wireless power receiver 314 may be a matched pair of resonant induction coils. Nonetheless, it is understood that any other suitable wireless power transmission method (e.g., inductive coupling, capacitive coupling, etc.) may be used.

In certain embodiments, movement of powered spray arm 300 is controlled, at least in part, by controller 137. For instance, controller 137 may be in operable communication with powered spray arm 300 and configured to initiate a motorized spray movement at the powered spray arm 300. The operable communication between powered spray arm 300 and controller 137 may be direct (e.g., via a wireless data connection) or indirect (e.g., via electromagnetic field communication supplied from wireless power transmitter 312). The motorized spray movement may notably be divorced from a fluid flow rate from any fluid pump (e.g., pump 154). Thus, the path of movement (e.g., rotation) or velocity of movement (e.g., rate of rotation) for powered spray arm 300 may be unaffected by the flow rate or pressure from the upstream pump (e.g., circulation pump 154).

In optional embodiments, the motorized spray movement initiated at controller 137 may include directing a signal or voltage to wireless power transmitter 312 in order to generate the electromagnetic field therefrom. In some such embodiments, activation of electric motor 310 is controlled entirely on the electrical current directed thereto. Alternatively, a secondary controller 320 may be mounted on powered spray arm 300 (e.g., with electric motor 310). Secondary controller 320 may be configured to control the movement or path of powered spray arm 300 (e.g., by controlling the rotation direction or speed electric motor 310) when power is supplied thereto (e.g., from a current induced at wireless power receiver 314). Thus, electric motor 310 may be communicatively isolated from controller 137. Notably, a complex transmission of data signals from controller 137 to electric motor 310 may be avoided.

In additional or alternative embodiments, the motorized spray movement of spray arm 300 may be contingent on one or more programmed restriction conditions, such as door 120 being in the closed position. When door 120 is in the closed position (e.g., as determined at any position sensor or latch assembly engaged with door 120), controller 137 may direct or permit wireless power transmitter 312 to initiate an electromagnetic field to be transmitted therefrom. The transmitted electromagnetic field may then be received by the wireless power receiver 314 to generate a corresponding electrical current, which can activate electric motor 310. By contrast, when door 120 is in the closed position, controller 137 may restrict transmission of the electromagnetic field from wireless power transmitter 312 (e.g., by halting any current or voltage to wireless power transmitter 312). Thus, communication between wireless power transmitter 312 and wireless power receiver 314 is restricted in the open position of the door 120. Optionally, the powered spray arm 300 may be an electrically isolated assembly. In particular, powered spray arm 300 may be electrically isolated such that no electrical power storage (e.g., electrical battery or ultracapacitor) is provided thereon. Thus, in the absence of wireless communication with wireless power transmitter 312, powered spray arm 300 may be free of a current or voltage therethrough, advantageously preventing unintended operation (e.g., when door 120 is in the open position).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a vertical direction, the dishwashing appliance comprising:
    a cabinet;
    a tub defining a wash chamber within the cabinet;
    a spray arm movably disposed within the wash chamber, the spray arm defining one or more orifices to direct wash fluid to the wash chamber;
    a fluid pump in fluid communication with the spray arm to motivate wash fluid thereto;
    an electric motor mounted apart from the fluid pump in mechanical communication with the spray arm to direct a spray position thereof;
    a wireless power receiver in electrical communication with the electric motor; and
    a wireless power transmitter spaced apart from the fluid pump in operable communication with the wireless power receiver to transmit an electromagnetic field thereto.

2. The dishwashing appliance of claim 1, wherein the electric motor is disposed within the wash chamber.

3. The dishwashing appliance of claim 1, wherein the wireless power receiver is disposed within the wash chamber.

4. The dishwashing appliance of claim 1, further comprising:
    a dish rack slidably disposed on in the tub to receive one or more articles within the wash chamber, wherein the spray arm is disposed above the dish rack along the vertical direction.

5. The dishwashing appliance of claim 1, further comprising:
    a dish rack slidably disposed on in the tub to receive one or more articles within the wash chamber, wherein the spray arm is mounted to the dish rack to slide therewith.

6. The dishwashing appliance of claim 5, wherein the electric motor is fixed relative to the dish rack.

7. The dishwashing appliance of claim 1, wherein the electric motor is a direct current (DC) motor configured to receive a DC voltage.

8. The dishwashing appliance of claim 7, wherein the DC motor has a power rating less than or equal to 50 watts.

9. The dishwashing appliance of claim 1, further comprising:
    a controller mounted apart from the wash chamber in electrical communication with the wireless power transmitter, the controller being configured to initiate a motorized spray movement at the spray arm, the motorized spray movement being divorced from a fluid flow rate from the fluid pump.

10. This dishwashing appliance of claim 9, further comprising:
    a secondary controller mounted on the spray arm in electrical communication with the electric motor to control movement thereof.

11. A dishwashing appliance defining a vertical direction, the dishwashing appliance comprising:
    a cabinet;
    a tub defining a wash chamber within the cabinet;
    a spray arm movably disposed within the wash chamber, the spray arm defining one or more orifices to direct wash fluid to the wash chamber;
    a fluid pump in fluid communication with the spray arm to motivate wash fluid thereto;
    an electric motor mounted within the wash chamber in mechanical communication with the spray arm to direct a spray position thereof;
    a wireless power receiver in electrical communication with the electric motor; and
    a wireless power transmitter mounted to the cabinet outside of the tub in operable communication with the wireless power receiver to transmit an electromagnetic field thereto.

12. The dishwashing appliance of claim 11, wherein the wireless power receiver is disposed within the wash chamber.

13. The dishwashing appliance of claim 11, further comprising:
    a dish rack slidably disposed in the tub to receive one or more articles within the wash chamber, wherein the spray arm is disposed above the dish rack along the vertical direction.

14. The dishwashing appliance of claim 11, further comprising:
    a dish rack slidably disposed in the tub to receive one or more articles within the wash chamber, wherein the spray arm is mounted to the dish rack to slide therewith.

15. The dishwashing appliance of claim 14, wherein the electric motor is fixed relative to the dish rack.

16. The dishwashing appliance of claim 11, wherein the electric motor is a direct current (DC) motor configured to receive a DC voltage.

17. The dishwashing appliance of claim 16, wherein the DC motor has a power rating less than or equal to 50 watts.

18. The dishwashing appliance of claim 11, further comprising:
- a controller mounted apart from the wash chamber in electrical communication with the wireless power transmitter, the controller being configured to initiate a motorized spray movement at the spray arm, the motorized spray movement being divorced from a fluid flow rate from the fluid pump.

19. This dishwashing appliance of claim 18, further comprising:
- a secondary controller mounted on the spray arm in electrical communication with the electric motor to control movement thereof.

\* \* \* \* \*